US012347597B2

(12) United States Patent
Oide et al.

(10) Patent No.: US 12,347,597 B2

(45) Date of Patent: Jul. 1, 2025

(54) MULTI-LAYER INDUCTOR

(71) Applicant: TDK Corporation, Tokyo (JP)

(72) Inventors: Akihiko Oide, Tokyo (JP); Makoto Yoshino, Tokyo (JP); Tomoki Okada, Yurihonjo (JP); Seiji Osada, Yurihonjo (JP); Yuuki Okazaki, Yurihonjo (JP); Takeshi Sasaki, Yurihonjo (JP); Mitsuru Ito, Yurihonjo (JP); Kenta Sasaki, Yurihonjo (JP); Kazuhiro Ebina, Tokyo (JP); Takashi Abe, Tokyo (JP); Hiroshi Ono, Yurihonjo (JP)

(73) Assignee: TDK CORPORATION, Tokyo (JP)

( * ) Notice: Subject to any disclaimer, the term of this patent is extended or adjusted under 35 U.S.C. 154(b) by 619 days.

(21) Appl. No.: 17/696,169

(22) Filed: Mar. 16, 2022

(65) Prior Publication Data

US 2022/0310301 A1 Sep. 29, 2022

(30) Foreign Application Priority Data

Mar. 23, 2021 (JP) ................................ 2021-049139
Dec. 3, 2021 (JP) ................................ 2021-196979

(51) Int. Cl.
*H01F 27/08* (2006.01)
*H01F 27/28* (2006.01)
*H01F 27/29* (2006.01)

(52) U.S. Cl.
CPC ....... *H01F 27/085* (2013.01); *H01F 27/2804* (2013.01); *H01F 27/292* (2013.01); *H01F 2027/2809* (2013.01)

(58) Field of Classification Search
CPC .. H01F 27/085; H01F 27/2804; H01F 27/292; H01F 2027/2809
See application file for complete search history.

(56) References Cited

U.S. PATENT DOCUMENTS

| | | | | |
|---|---|---|---|---|
| 7,498,919 | B2 * | 3/2009 | Fujiwara | H01F 17/0033 336/200 |
| 12,020,845 | B2 * | 6/2024 | Yamauchi | H01F 27/292 |
| 2006/0145804 | A1 * | 7/2006 | Matsutani | H01F 27/292 336/200 |
| 2010/0039200 | A1 * | 2/2010 | Yan | H01F 17/04 336/147 |
| 2014/0253276 | A1 * | 9/2014 | Iwasaki | H01F 27/2804 336/200 |
| 2018/0096789 | A1 * | 4/2018 | Oshima | H01F 41/046 |
| 2019/0206611 | A1 * | 7/2019 | Matsumoto | H01F 17/04 |
| 2020/0176170 | A1 * | 6/2020 | Terauchi | H01F 27/2804 |
| 2022/0037075 | A1 * | 2/2022 | Arai | H01F 27/292 |
| 2022/0037083 | A1 * | 2/2022 | Arai | H01F 27/24 |

FOREIGN PATENT DOCUMENTS

| | | | | |
|---|---|---|---|---|
| CN | 104036917 | A | | 9/2014 |
| JP | 2004165440 | A | * | 6/2004 |
| JP | 2020-088289 | A | | 6/2020 |

* cited by examiner

*Primary Examiner* — Malcolm Barnes
(74) *Attorney, Agent, or Firm* — Oliff PLC

(57) ABSTRACT

In the multi-layer inductor, all of the plurality of through conductors are not aligned in a straight line, and the distance between the through conductors can be sufficiently kept in the element body having a predetermined dimensional standard. Therefore, the through conductor as a heat source is apart from each other, and the heat of the through conductor can be efficiently radiated to the outside of the element body.

4 Claims, 15 Drawing Sheets

MULTI-LAYER INDUCTOR

CROSS-REFERENCE TO RELATED APPLICATIONS

This application is based upon and claims the benefit of priority from Japanese Patent Applications No. 2021-49139, filed on 23 Mar. 2021 and No. 2021-196979, filed on 3 Dec. 2021, the entire contents of which are incorporated herein by reference.

TECHNICAL FIELD

The present disclosure relates to a multi-layer inductor.

BACKGROUND

Known in the art is an inductor including a through conductor linearly extending in an element body. Japanese Patent Laid-Open No. 2020-88289 (Patent Document 1) discloses an inductor including an element body having a pair of end surfaces facing each other, three through conductors extending between the end surfaces, and a pair of external electrodes provided on both the end surfaces of the element body and connected to the respective through conductors. In the inductor disclosed in Patent Document 1, the three through conductors having strip-shape are overlapped and arranged so that the through conductors are close to each other.

SUMMARY

In the above-described inductor according to the conventional art, a voltage is applied between the pair of external electrodes and electric currents flow through the through conductors when the inductor is driven. At this time, each of the through conductors generates heat, and the electric resistance of each of the through conductors becomes high as the temperature of the through conductors becomes high. Therefore, it is necessary to efficiently radiate the heat of the through conductor to the outside of the element body. However, the above-described inductor according to the conventional art cannot sufficiently radiate the heat.

According to an aspect of the present disclosure, a multi-layer inductor with improved heat radiation is provided.

A multi-layer inductor according to one aspect of the present disclosure includes an element body including a plurality of layers stacked, the element body having a mounting surface orthogonal to stacking direction of the plurality of layers and a pair of end surfaces facing each other in a direction orthogonal to the stacking direction of the plurality of layers, a plurality of through conductors provided in the element body, extending between the end surfaces along a facing direction of the pair of end surfaces, and having end portions exposed at the end surfaces, and a pair of external electrodes respectively provided on the end surfaces of the element body and integrally covering the plurality of through conductors exposed at the end surfaces, wherein each of the through conductors has a cross-sectional shape extending parallel to the mounting surface in a cross section orthogonal to the facing direction of the pair of end surfaces, and wherein the plurality of through conductors include a first through conductor, a second through conductor, and a third through conductor, and wherein a center of the first through conductor is displaced from a virtual line connecting a center of the second through conductor and a center of the third through conductor in the cross section orthogonal to the facing direction of the pair of end surfaces.

In the multi-layer inductor, the center of the first through conductor is displaced from a virtual line connecting the center of the second through conductor and the center of the third through conductor in a cross section orthogonal to the facing direction of the pair of end surfaces. Therefore, the heat of the through conductor can be efficiently radiated to the outside of the element body.

In the multi-layer inductor according to another aspect, the center of the first through conductor and the center of the second through conductor are equidistant from the center of the third through conductor in the cross section orthogonal to the facing direction of the pair of end surfaces.

In the multi-layer inductor according to another aspect, each of the through conductors has a rectangular cross-sectional shape extending parallel to the mounting surface and two corners of the rectangular cross-sectional shape on a side farther from the mounting surface are rounded in the cross section orthogonal to the facing direction of the pair of end surfaces.

In the multi-layer inductor according to another aspect, a length of the through conductor in a first direction orthogonal to the stacking direction of the element body and the facing direction of the pair of end surfaces are 10 to 30% of length of the element body in the first direction.

DETAILED DESCRIPTION

Figure 1:
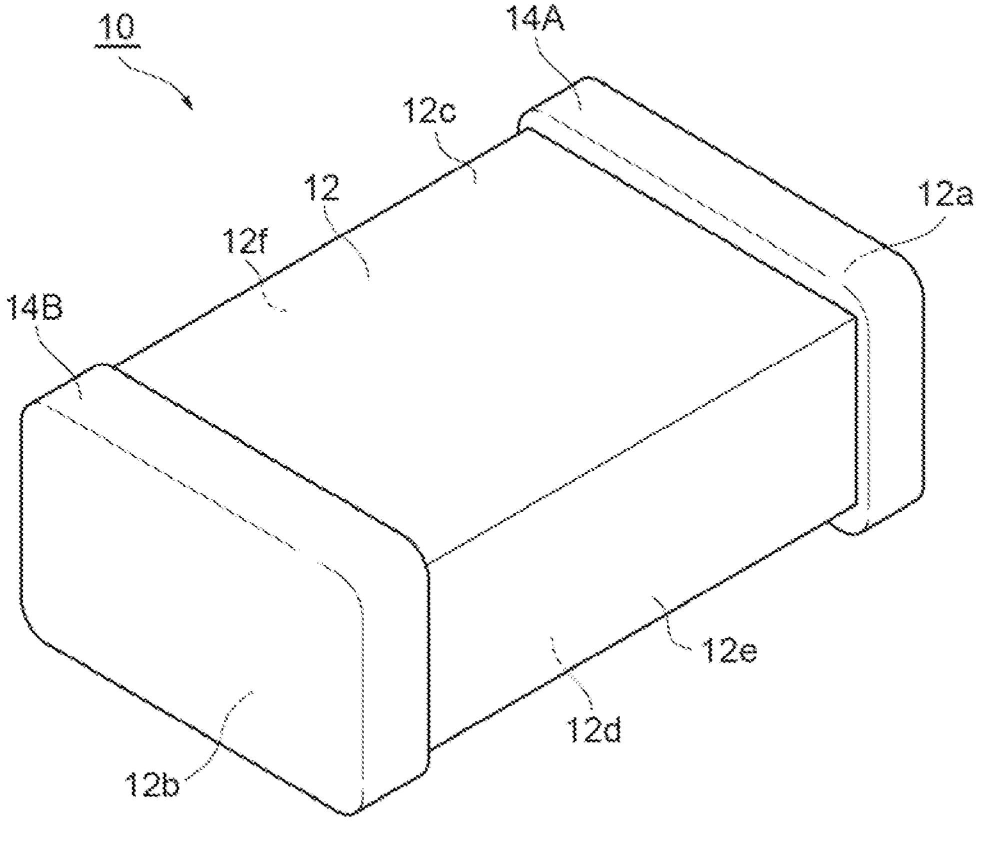
FIG. 1 is a perspective view showing a multi-layer inductor according to an embodiment.

Hereinafter, embodiments for carrying out the present disclosure will be described with reference to the accompanying drawings. In the description of the drawings, the same or equivalent elements are denoted by the same reference numerals, and redundant description will be omitted.

The configuration of a multi-layer inductor according to an embodiment will be described with reference to FIGS. 1 to 4. As shown in FIG. 1, the multi-layer inductor 10 according to the embodiment includes an element body 12 and a pair of external electrodes 14A and 14B.

The element body 12 has a substantially rectangular parallelepiped outer shape and includes a pair of end surfaces 12*a* and 12*b* facing each other in the extending direction of the element body 12. The element body 12 further includes four side surfaces 12*c* to 12*f* extending in the facing direction of the end surface 12*a* and 12*b* to connect the end surfaces 12*a* and 12*b* to each other. The side surface 12*d* is a mounting surface facing the mounting substrate when the multi-layer inductor 10 is mounted, and the side surface 12*c* facing the side surface 12*d* is a top surface when the multi-layer inductor 10 is mounted. The dimensions of the element body 12 are, for example, 2.5 mm length×2 mm width×0.9 mm thickness, where a dimension in the facing direction of the end faces 12*a* and 12*b* is a length, a dimension in the facing direction of the side faces 12*e* and 12*f* is a width, and a dimension in the facing direction of the side faces 12*c* and 12*d* is a thickness. In the present embodiment, the element body 12 is designed such that the width is longer than the thickness. The element body 12 is designed so that the length is longer than the width.

Figure 4:
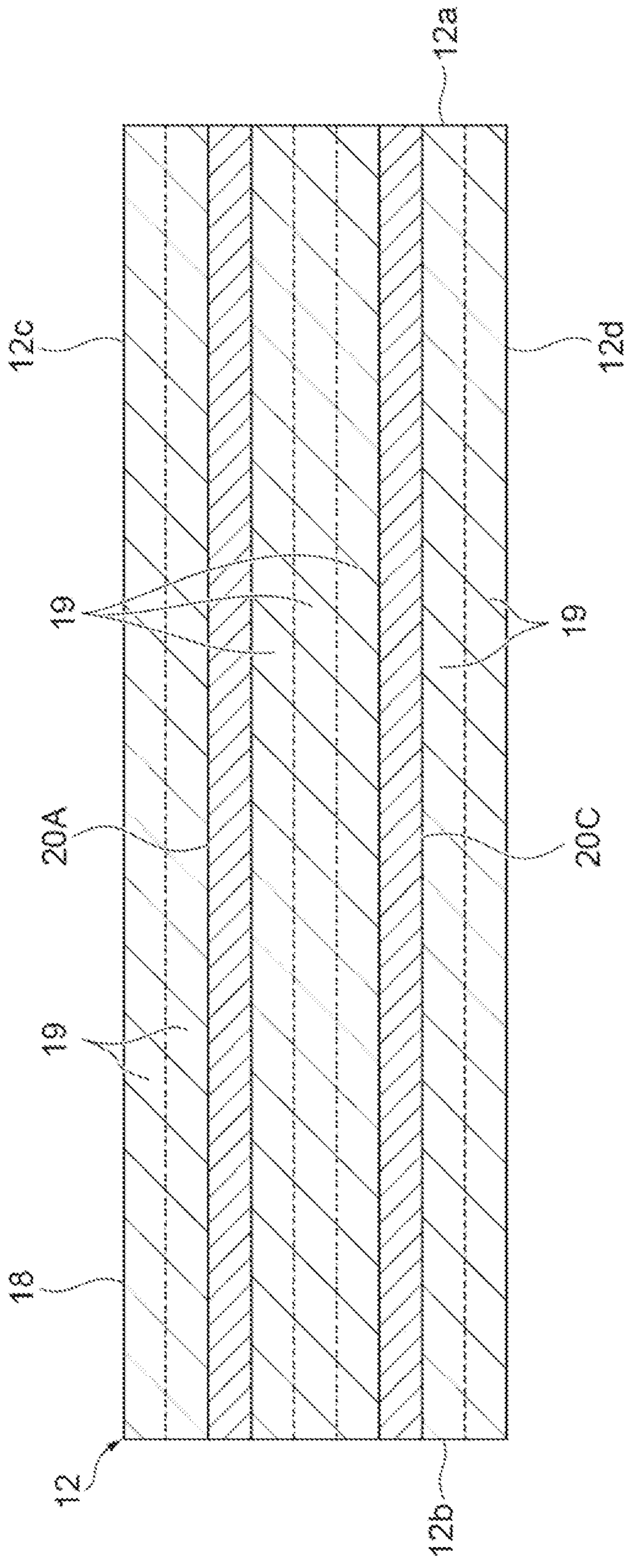
FIG. 4 is a cross-sectional view taken along line IV-IV of the element body shown in FIG. 2.

The element body 12 has a configuration in which internal electrodes 20 are provided inside a magnetic body 18. As shown in FIG. 4, the element body 12 has a stacking structure in which a plurality of magnetic material layers 19 constituting the magnetic body 18 are stacked in the facing direction of the side surfaces 12*c* and 12*d*. In the following description, the facing direction of the side surfaces 12*c* and 12*d* is also referred to as the stacking direction of the element body 12.

The magnetic body 18 is made of a magnetic material such as ferrite. The magnetic body 18 is obtained by stacking a plurality of magnetic body pastes (for example, ferrite pastes) and sintering to become the magnetic material layers 19. That is, the element body 12 has a printed stacking structure in which the magnetic material layers 19 on which the magnetic material paste is printed are stacked, and is a sintered element body in which the sintered magnetic material layers 19 are stacked. The number of magnetic material layers 19 constituting the element body 12 is, for example, 150. In the actual element body 12, the plurality of magnetic material layers 19 are integrated to such an extent that the boundaries between the layers cannot be visually recognized.

Figure 2:
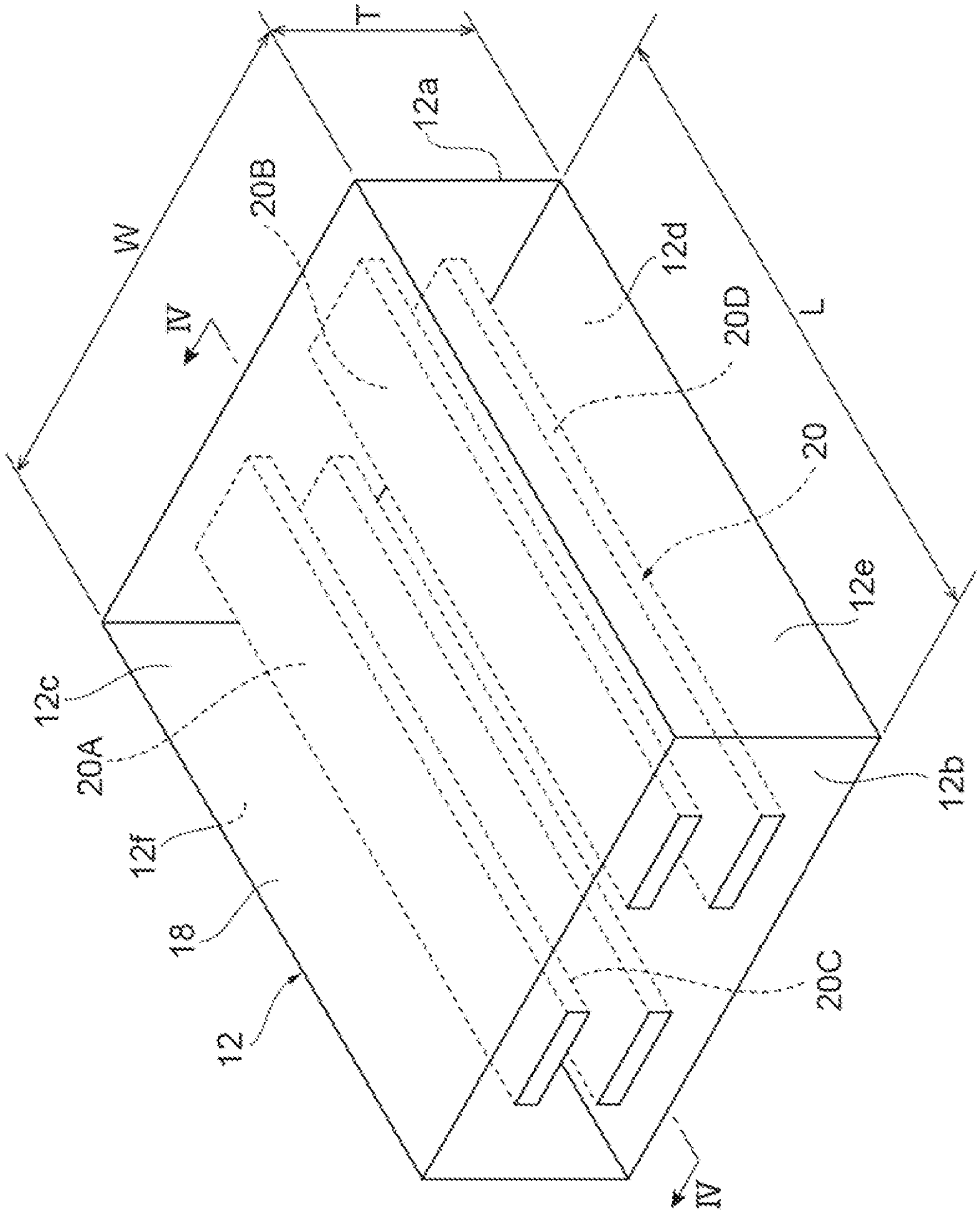
FIG. 2 is a perspective view showing the through conductors of the element body shown in FIG. 1.
Figure 3:
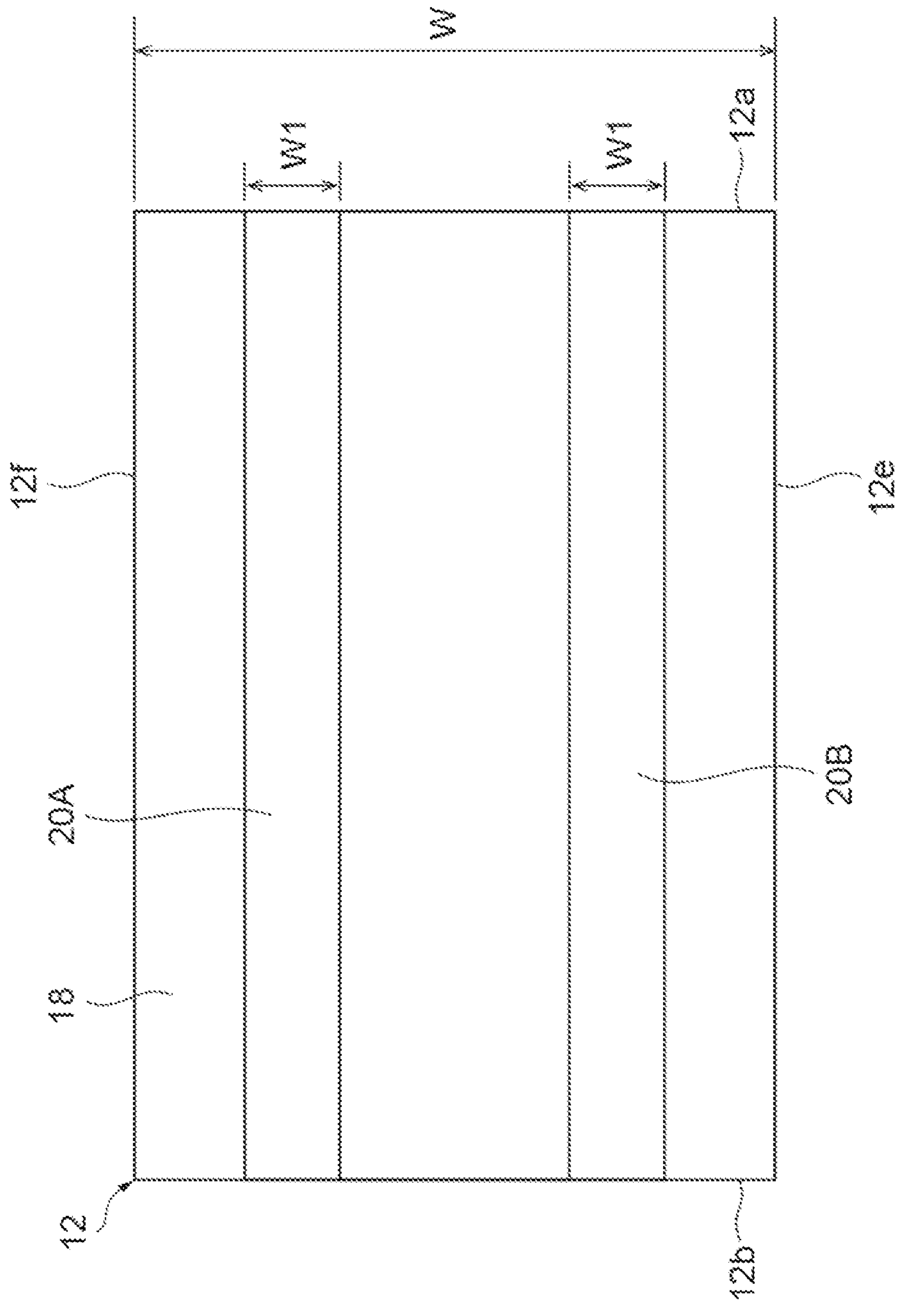
FIG. 3 is a plan view showing the through conductors shown in FIG. 2.

As shown in FIGS. 2 and 3, the internal electrode 20 extends between the pair of end surfaces 12*a* and 12*b*. As shown in FIG. 4, the internal electrodes 20 are located between two different magnetic material layers 19. The internal electrodes 20 are made of a conductive material containing a metal such as Ag. The internal electrodes 20 are formed by a printing method. Specifically, the internal electrodes 20 are obtained by applying a conductive paste (for example, Ag paste) to be the internal electrodes 20 on a magnetic paste to be the magnetic material layers 19 and sintering the conductive paste.

The internal electrode 20 includes four through conductors 12*a* to 12*b* extending along a direction in which the end surfaces 20A and 20D face each other. Each of the through conductors 20A to 20D extends between the end surfaces 12*a* and 12*b* (that is, from the end surface 12*a* to the end surface 12*b* of the element body 12). The through conductors 20A to 20D are exposed to the end surfaces 12*a* and 12*b* at both ends, respectively.

Figure 5:
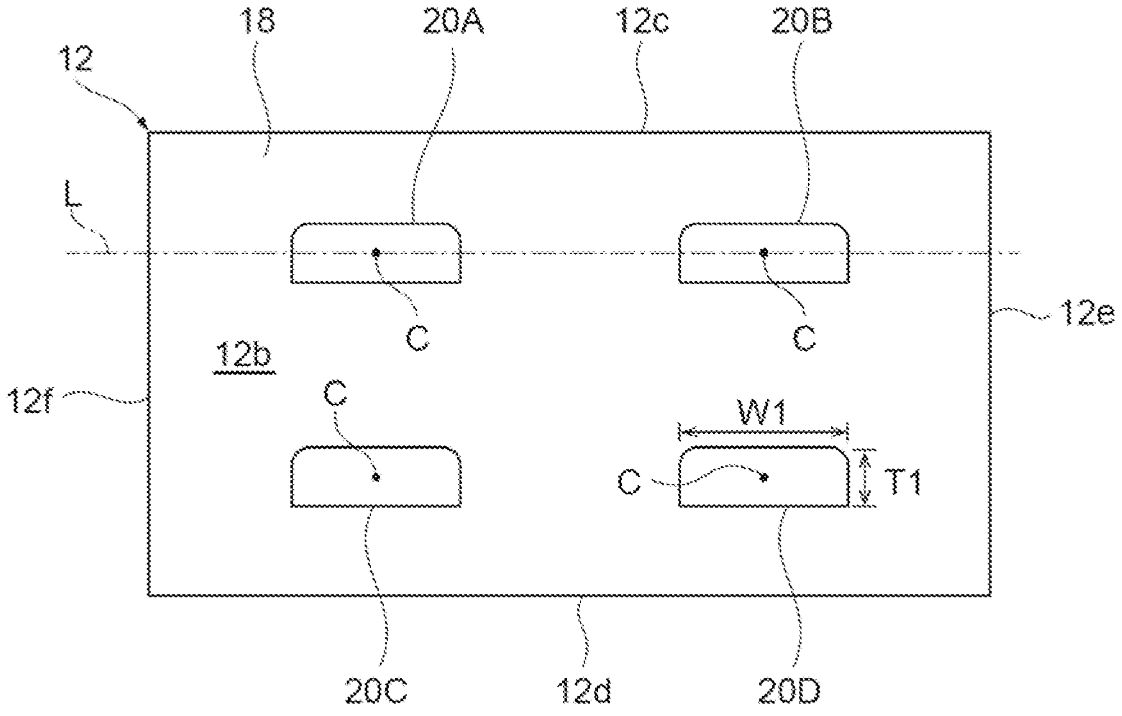
FIG. 5 is a view showing the arrangement of the through conductors shown in FIG. 2 on the element-body end face.

Among the four through conductors 20A to 20D, the through conductor 20A and the through conductor 20B are located between the same layers of the plurality of magnetic material layers 19, and the through conductor 20C and the through conductor 20D are located between the same layers different from the layers in which the through conductors 20A and 20B are located. The through conductor 20A and the through conductor 20C are arranged along the stacking direction of the element body 12. Similarly, the through conductor 20B and the through conductor 20D are arranged along the stacking direction of the element body 12. Therefore, the distance between the through conductors 20A and 20B is equal to the distance between the through conductors 20C and 20D. The distance between the through conductors 20A and 20C is equal to the distance between the through conductors 20B and 20D. [0020] in the present embodiment, as shown in FIG. 5, each of the through conductors 20A to 20D has a strip shape having a uniform width W1 and a uniform thickness T1. In the present embodiment, each of the through conductors 20A to 20D has a cross-sectional shape of a cross section orthogonal to the facing direction of the end surfaces 12*a* and 12*b*, in which two corners on the side far from the mounting surface among four corners of a rectangle extending in parallel to the mounting surface (side surface 12*d*) are rounded (i.e., semicylindrical cross sectional shape). The cross-sectional shape of each of the through conductors 20A to 20D may be a rectangular shape extending parallel to the mounting surface, or may be a semi-elliptical shape in which the mounting surface side is flat. In the present embodiment, the through conductors 20A to 20D have the same dimensions, and are, for example, 2.5 mm length×0.4 mm width (W1)×0.1 mm thickness (T1). In the present embodiment, the through conductors 20A to 20D are designed such that the widths W1 are longer than the thicknesses T1 (i.e., W1>T1). The ratio T1/W1 of the thicknesses T1 to the widths W1 of the through conductors may be $\frac{1}{6}<T1/W1<1$, or $\frac{1}{6}<T1/W1<\frac{1}{2}$.

The pair of external electrodes 14A and 14B are provided on the end surfaces 12*a* and 12*b* of the element body 12, respectively. The external electrode 14A covers the entire region of the end surface 12*a*, and is joined in direct contact with the through conductors 20A to 20D of the internal electrodes 20 exposed at the end surface 12*a*. Similarly, the external electrode 14B covers the entire region of the end surface 12*b*, and is joined in direct contact with the through conductors 20A to 20D of the internal electrodes 20 exposed at the end surface 126. In the present embodiment, as shown in FIG. 1, the external electrodes 14A and 14B integrally cover the end surfaces 12*a* and 12*b* and the side surfaces 12*c* to 12*f* of the region adjacent to the end surfaces 12*a* and 12*b*. Each of the external electrodes 14A and 14B is formed of one or more electrode layers. The external electrodes 14A and 14B may be made of a metallic material such as Ag or a resin electrode material.

Here, regarding the four through conductors 20A to 20D shown in FIG. 5, for example, the center C of the through conductor 20C (third through conductor) is apart from the virtual line L connecting the center C of the through conductor 20A (first through conductor) and the center C of the through conductor 20B (second through conductor). Also, the center C of the through conductor 20D is apart from the virtual line L. In other words, the four through conductors 20A to 20D are not aligned so that the centers C thereof are aligned in a straight line. The inventors have newly found that such an arrangement of the four through conductors 20A to 20D is effective for heat radiation of the element body. As the center C of each of the through conductors 20A to 20D, a gravity center, a figure center, or a geometric center in the end surface 12*b* can be adopted, and an intersection point of a line bisecting width of each of the through conductors 20A to 20D and a line bisecting thickness thereof can also be adopted.

Figure 6:
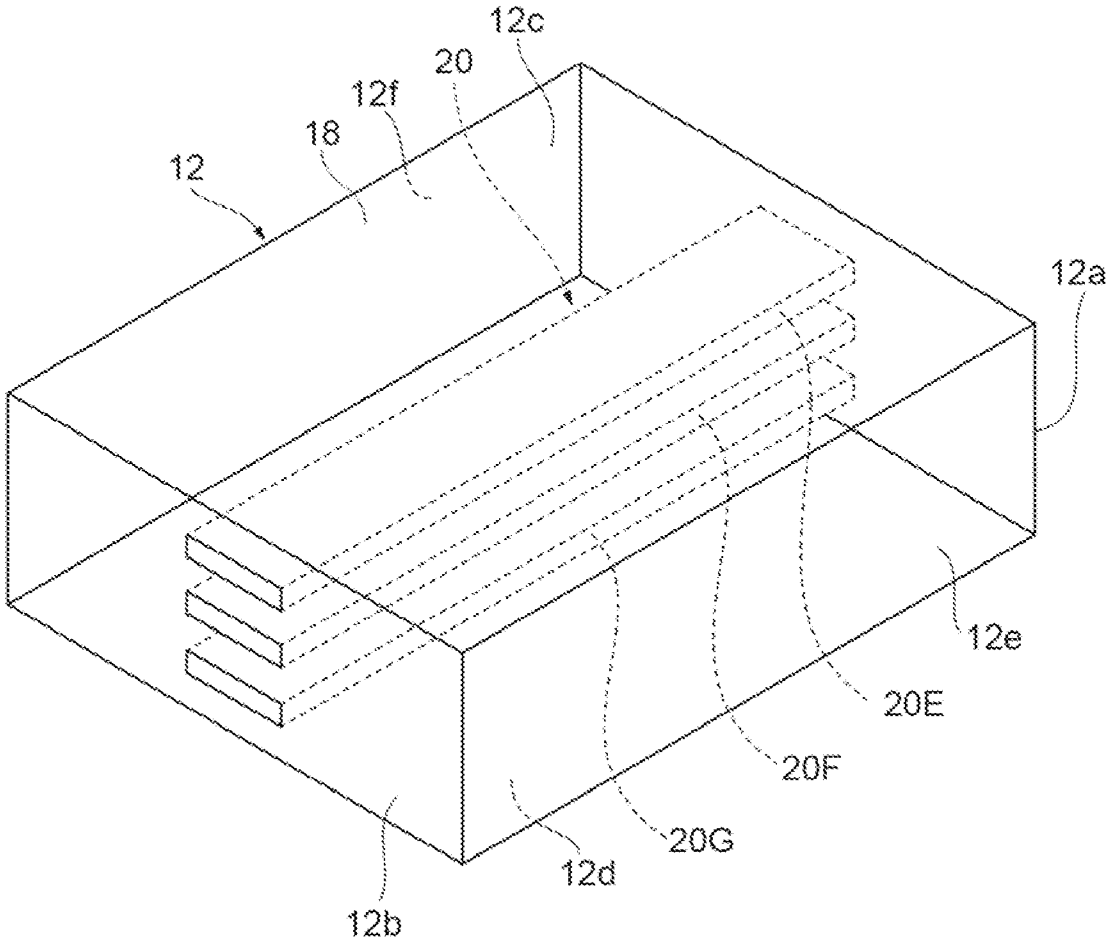
FIG. 6 is a perspective view showing a different form of the through conductors.
Figure 7:
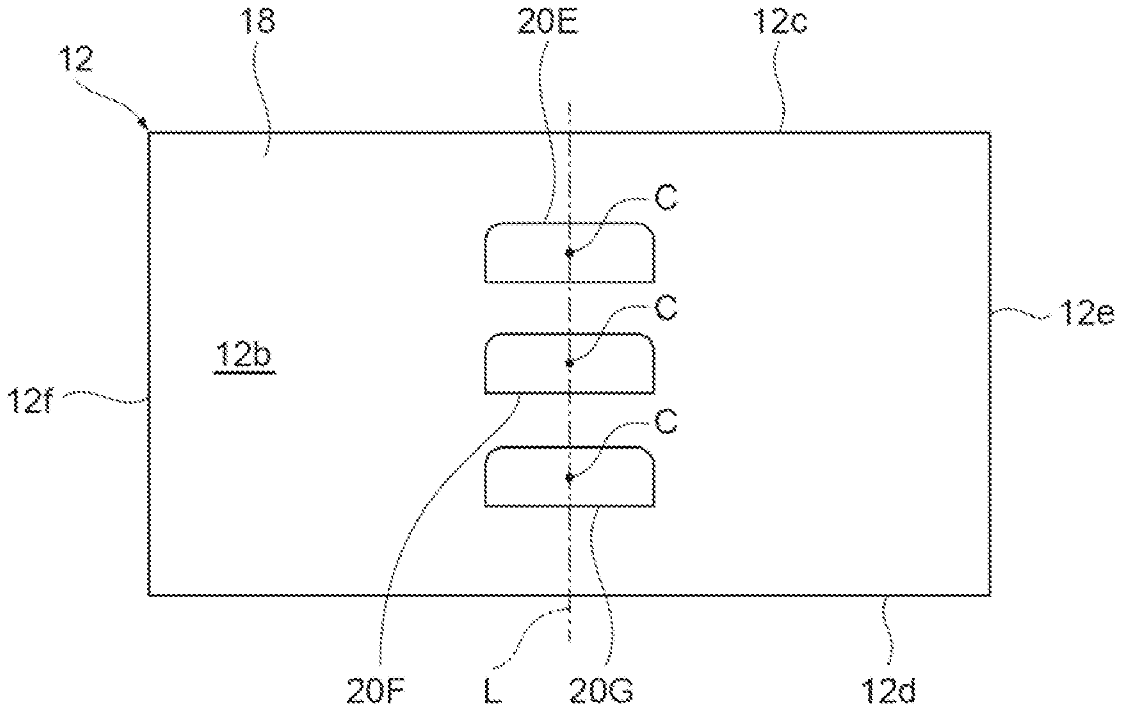
FIG. 7 is a view showing the arrangement of the through conductors shown in FIG. 6 on the element-body end face.

FIGS. 6 and 7 show a configuration in which three through conductors 20E to 20G of the internal electrode 20 are arranged in the stacking direction of the element body 12. The three through conductors 20E to 20G are aligned such that the centers C thereof are all located on the virtual line L and are lined up in a straight line. Therefore, as is clear from FIGS. 6 and 7, when the three through conductors 20E to 20G are disposed in the element body 12 having a predetermined dimensional standard, the through conductors 20E to 20G are close to each other, and sufficient distances cannot be kept. In this case, the through conductors 20E to 20G, which are heat sources, are densely arranged, and heat generated in the through conductors 20E to 20G during driving of the multi-layer inductor is unlikely to be radiated to the outside of the element body 12.

In the above-described multi-layer inductor 10, for example, since the center C of the through conductor 20C is designed to be apart from the virtual line L, all of the plurality of through conductors 20A to 20D are not aligned in a straight line, and the distances between the through conductors 20A to 20D can be sufficiently kept in the element body 12 of a predetermined dimensional standard. Therefore, the through conductors 20A to 20D, which are heat sources, are apart from each other, and heat of the through conductors 20A to 20D can be efficiently radiated to the outside of the element body 12.

In addition, in the multi-layer inductor 10, since each of the through conductors 20A to 20D has a cross-sectional shape extending in parallel to the mounting surface (side surface 12*d*), each of the through conductors 20A to 20D does not have a portion distant from the mounting surface as compared to a case where each of the through conductors 20A to 20D has a cross-sectional shape extending in a direction intersecting the mounting surface. That is, each of the through conductors 20A to 20D has a form close to the mounting surface as a whole. Therefore, a heat radiation path from the through conductors 20A to 20D, which are heat sources, to the mounting substrate on which the multi-layer inductor 10 is mounted via the external electrodes 14A and 14B is shortened. Therefore, in the multi-layer inductor 10, heat of the through conductors 20A to 20D can be efficiently radiated to the mounting substrate outside the element body 12.

Furthermore, in the multi-layer inductor 10, the length W1 of the through conductors 20A to 20D in a first direction (that is, the facing direction of the side surfaces 12*e* and 12*f*) orthogonal to the stacking direction of the element body 12 and the facing direction of the end surfaces 12*a* and 12*b* may be 10% to 30% of the width W of the element body 12 in the first direction.

Figure 8:
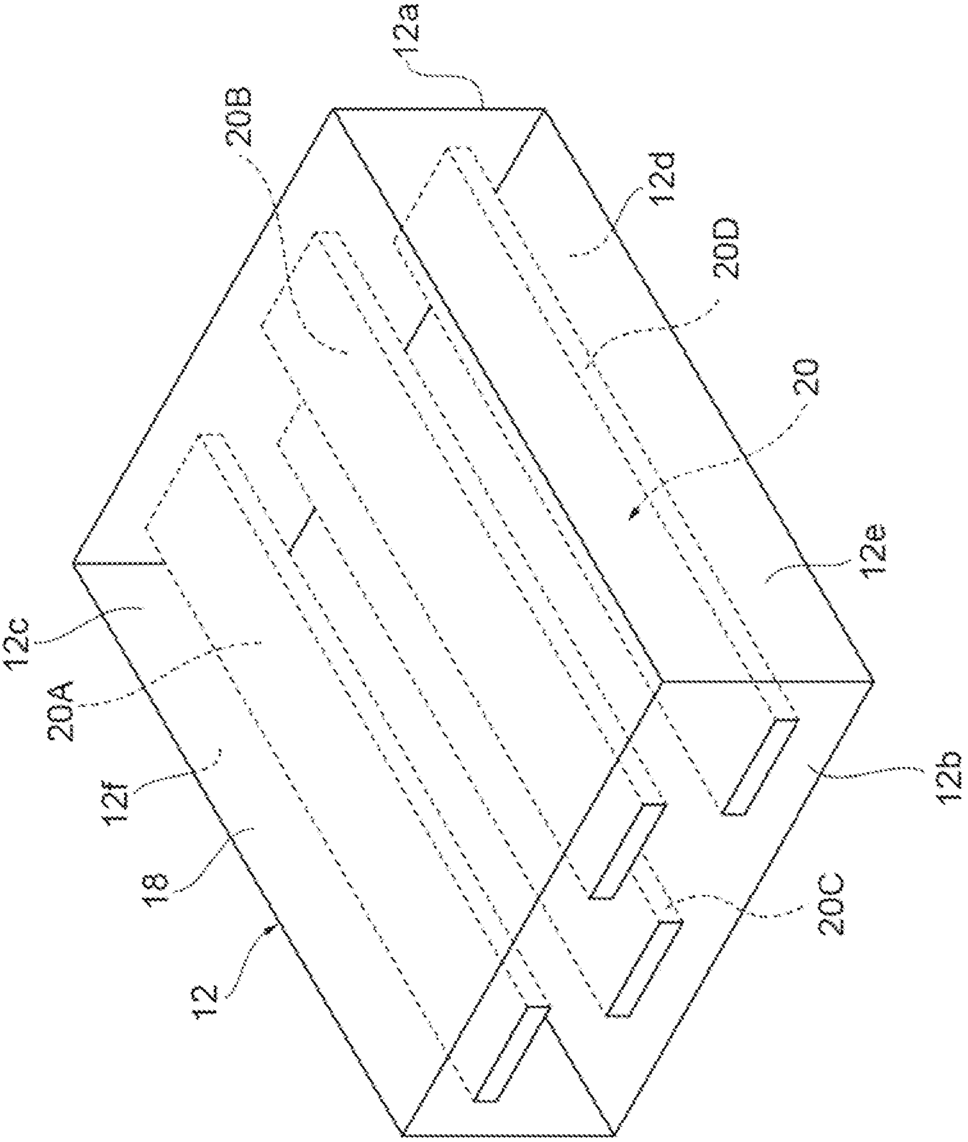
FIG. 8 is a perspective view showing a different form of the through conductors.
Figure 9:
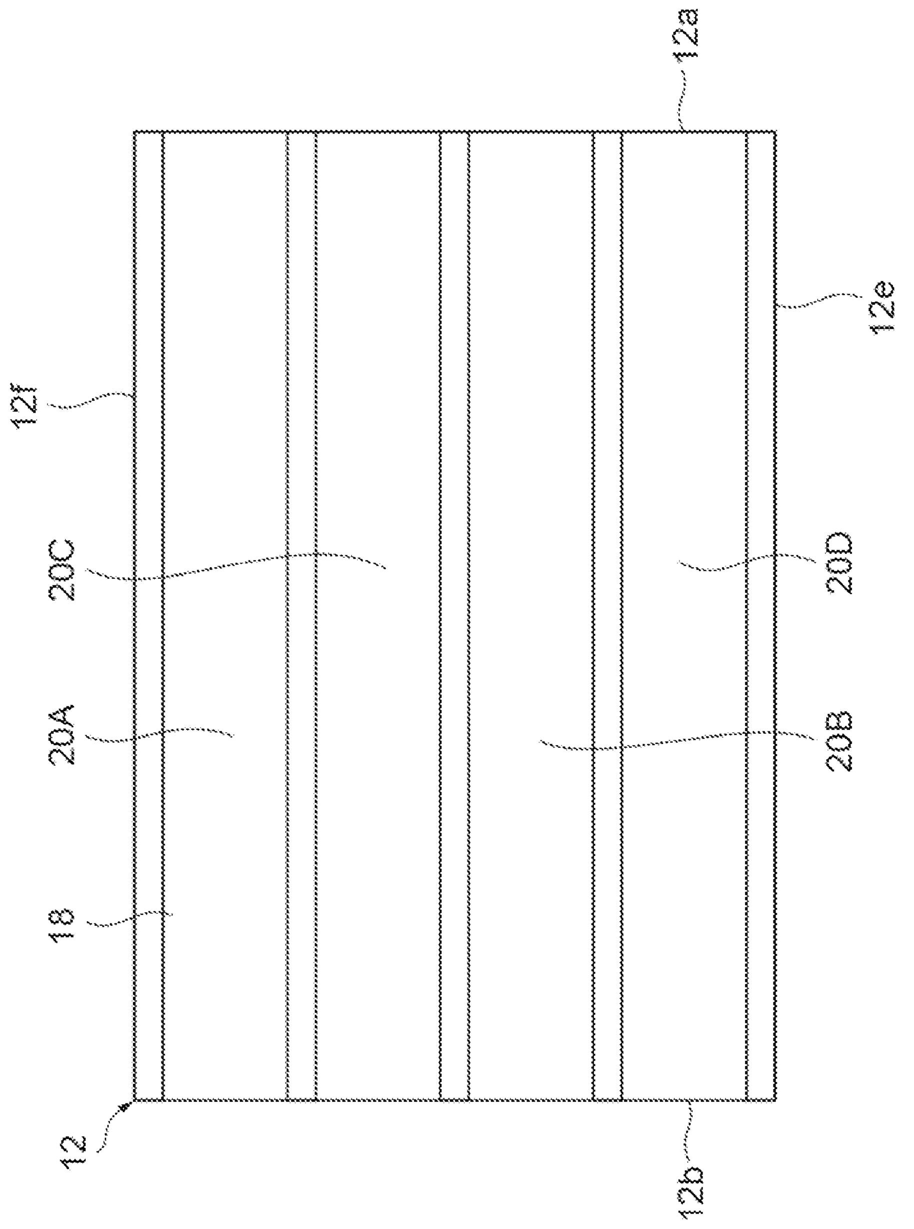
FIG. 9 is a plan view showing the through conductors shown in FIG. 8.
Figure 10:
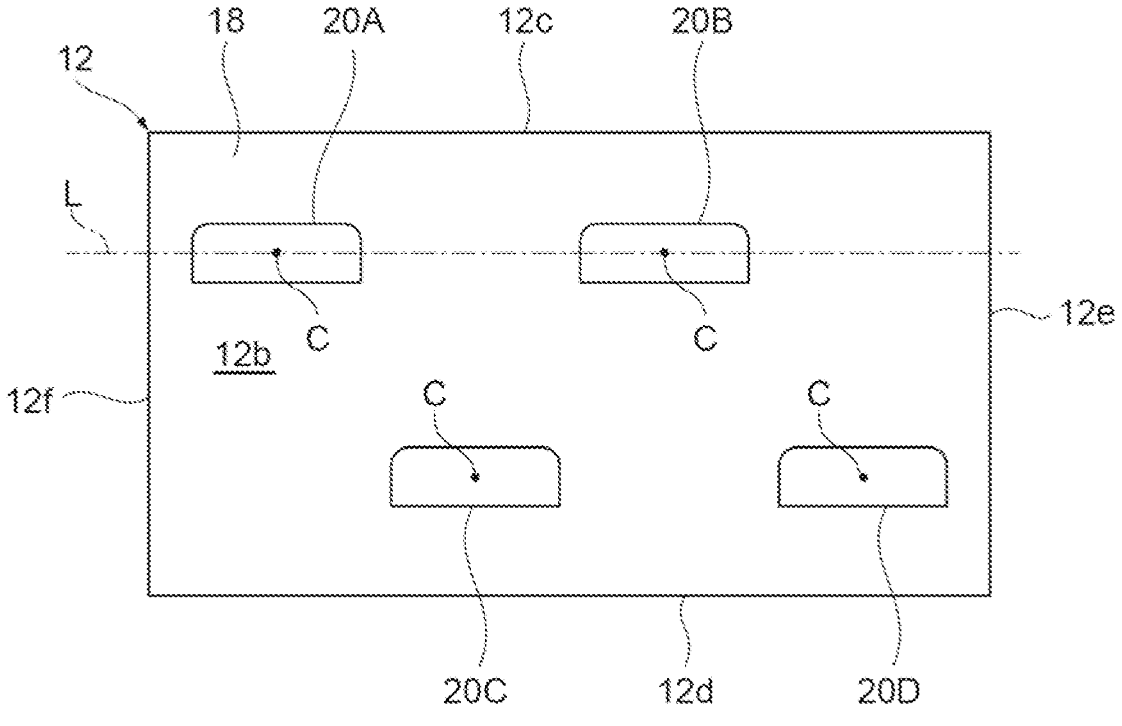
FIG. 10 is a view showing the arrangement of the through conductors shown in FIG. 8 on the element-body end surface.

In the four through conductors 20A to 20D, the through conductor 20A and the through conductor 20C do not necessarily have to be aligned along the stacking direction of the element body 12. Similarly, the through conductor 20B and the through conductor 20D do not necessarily have to be aligned along the stacking direction of the element body 12. For example, as shown in FIGS. 8 to 10, the through conductor 20A and the through conductor 20C may be apart from each other with regard to the facing direction of the side surfaces 12*e* and 12*f*, and the through conductor 20B and the through conductor 20D may be apart from each other with regard to the facing direction of the side surfaces 12*e* and 12*f*. In the embodiments shown in FIGS. 8 to 10, the distance between the through conductors 20A and 20B is equal to the distance between the through conductors 20C and 20D, and the pair of the through conductors 20A and 20B and the pair of the through conductors 20C and 20D are apart from each other with regard to the facing direction of the side surfaces 12*e* and 12*f*. As shown in FIG. 9, in a plan view, the through conductor 20C may be located equidistant from both the through conductors 20A and 20B, and the through conductor 20B may be located equidistant from both the through conductors 20C and 20D. As shown in FIG. 10, the centers C of the through conductors 20A and 20B may be equidistant from the center C of the through conductor 20C. Further, the centers C of the through conductors 20C and 20D may be equidistant from the center C of the through conductor 20B. In the present embodiment, the through conductors 20A and 20B and the through conductors 20C and 20D do not overlap in the stacking direction of the element body 12. At least one of the through conductors 20A and 20B may partially overlap at least one of the through conductors 20C and 20D in the stacking direction of the element body 12.

Also, in the configurations shown in FIGS. 8 to 10, for example, the center C of the through conductor 20C (third through conductor) is apart from the virtual line L connecting the center C of the through conductor 20A (first through conductor) and the center C of the through conductor 20B (second through conductor). Also, the center C of the through conductor 20D is apart from the virtual line L. In other words, the four through conductors 20A to 20D are not aligned so that the centers C thereof are aligned in a straight line. Therefore, as in the above-described embodiment, heat of the through conductors 20A to 20D is efficiently radiated to the outside of the element body 12.

The internal electrode 20 is not limited to the configuration including the four through conductors 20A to 20D, and may include at least three through conductors. FIGS. 11 to 15 show internal electrodes configured to include three through conductors.

Figure 11:
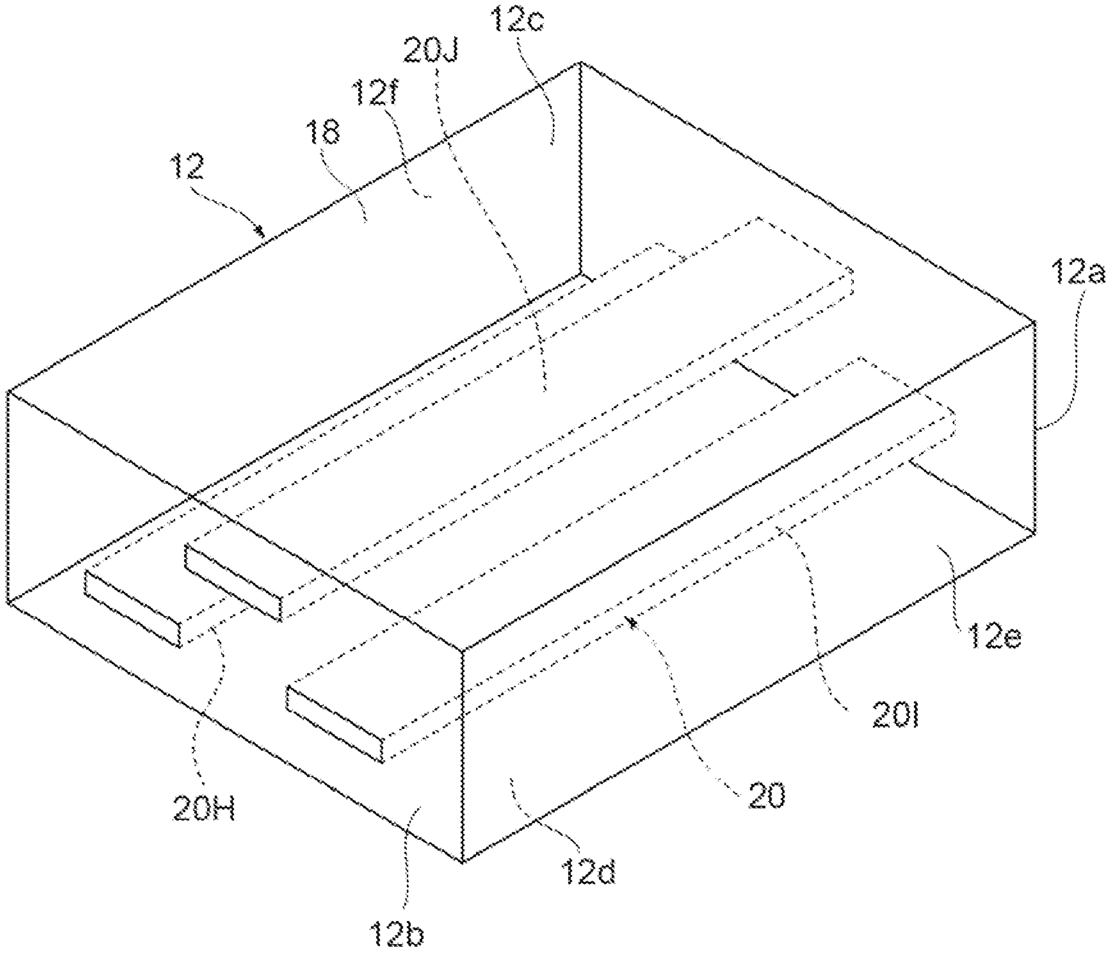
FIG. 11 is a perspective view showing a different form of the through conductors.
Figure 12:
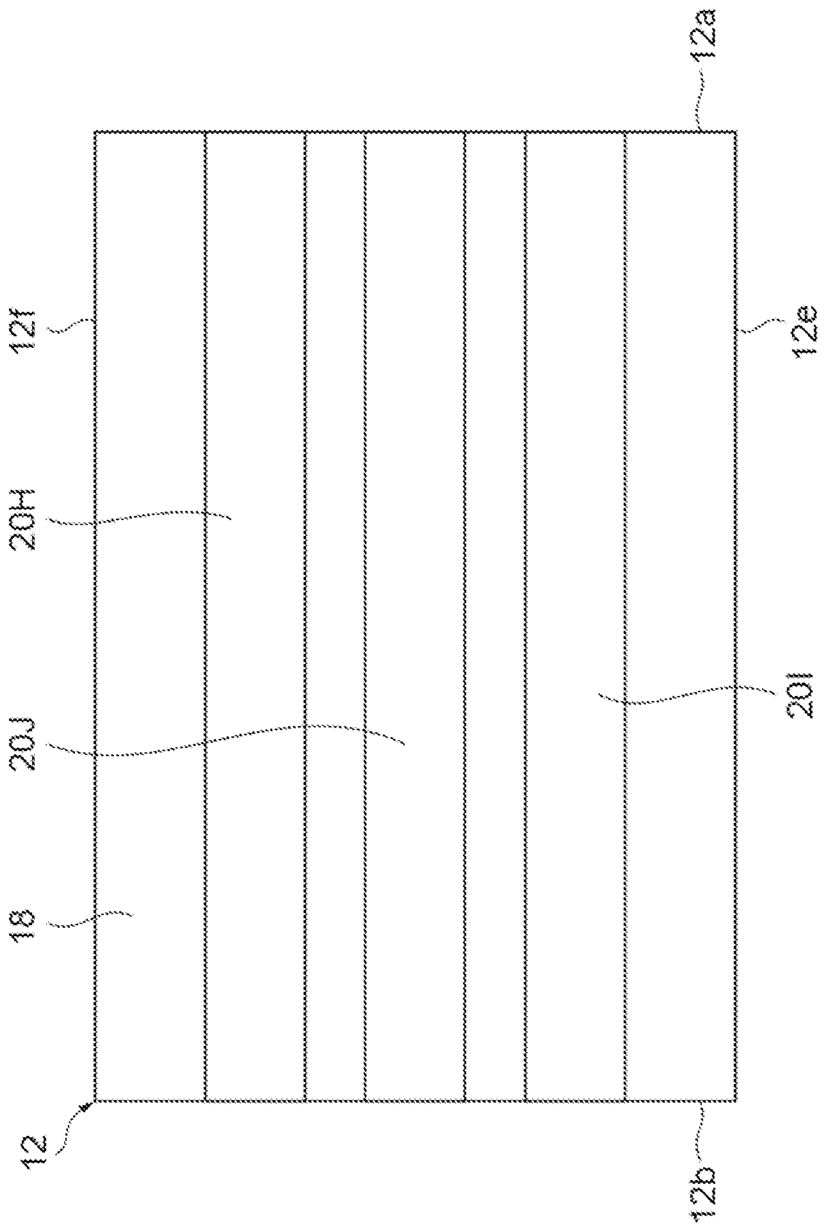
FIG. 12 is a plan view showing the through conductors shown in FIG. 11.
Figure 13:
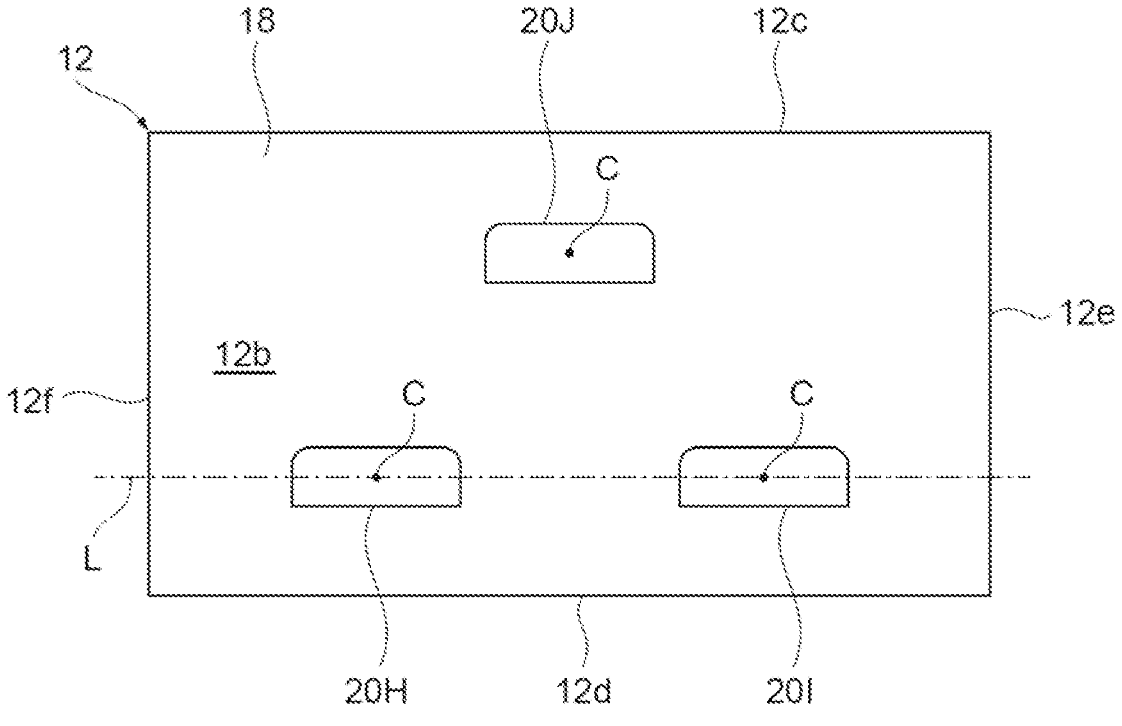
FIG. 13 is a view showing the arrangement of the through conductors shown in FIG. 11 on the element-body end face.

The internal electrode 20 shown in FIGS. 11 to 13 is configured to include two through conductors 20H and 20I located between the same layers of the plurality of magnetic material layers 19 and one through conductor 20H located between layers farther from the mounting surface (side surface 12*d*) than between layers where the through conductors 20J and 20I are located. The shapes of the through conductors 20H to 20J are the same as the shapes of the through conductors 20A to 20D described above. As shown in FIG. 12, in plan view, the through conductor 20J is positioned equidistant from both of the through conductors 20H and 20I. Therefore, as shown in FIG. 13, the centers C of the through conductors 20H and 20I are equidistant from the center C of the through conductor 20J. In the present embodiment, the through conductor 20J and the through conductors 20H and 20I do not overlap in the stacking direction of the element body 12. The through conductor 203 may partially overlap at least one of the through conductors 20H and 20I in the stacking direction of the element body 12.

Even in the configurations shown in FIGS. 11 to 13, the center C of the through conductor 203 (third through conductor) is apart from the virtual line L connecting the center C of the through conductor 20H (first through conductor) and the center C of the through conductor 20I (second through conductor). Therefore, as in the above-described embodiment, heat of the through conductors 20H to 20J is efficiently radiated to the outside of the element body 12.

Figure 14:
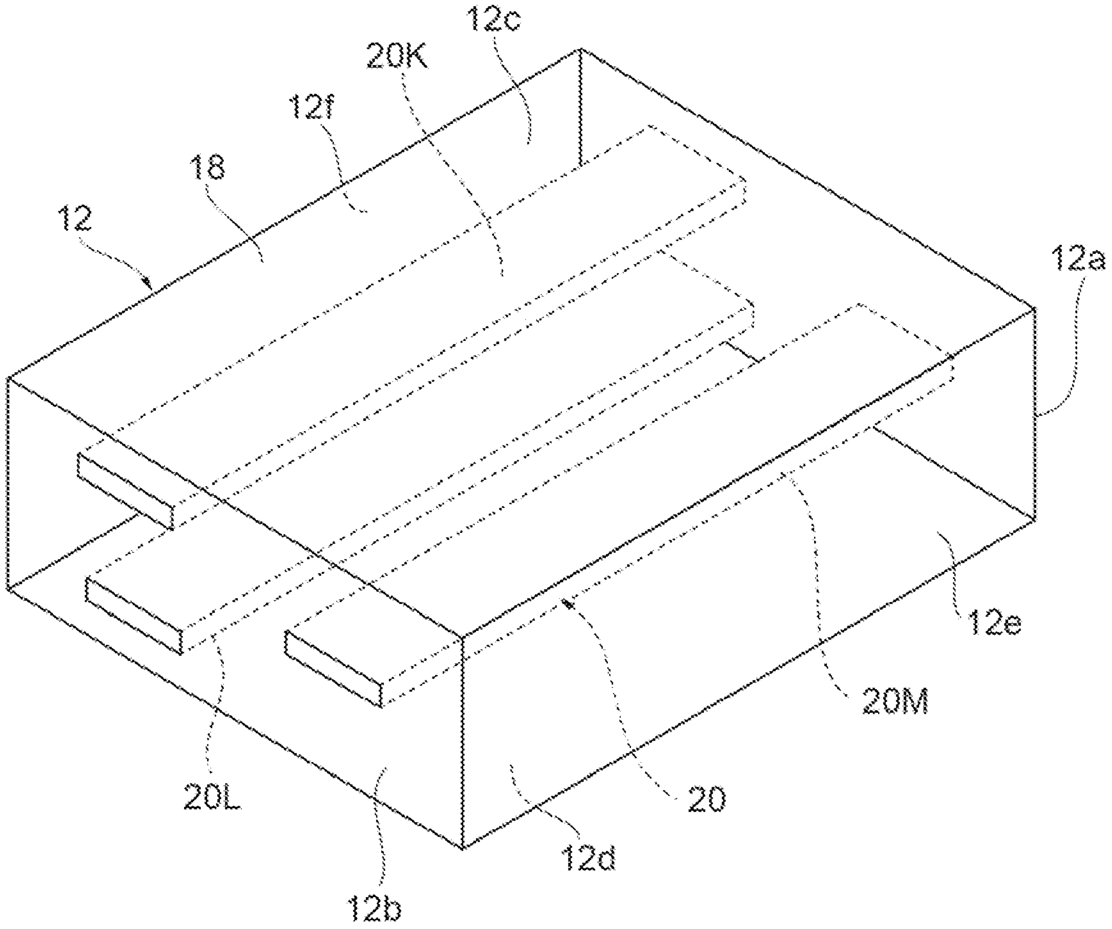
FIG. 14 is a perspective view showing a different form of the through conductors.
Figure 15:
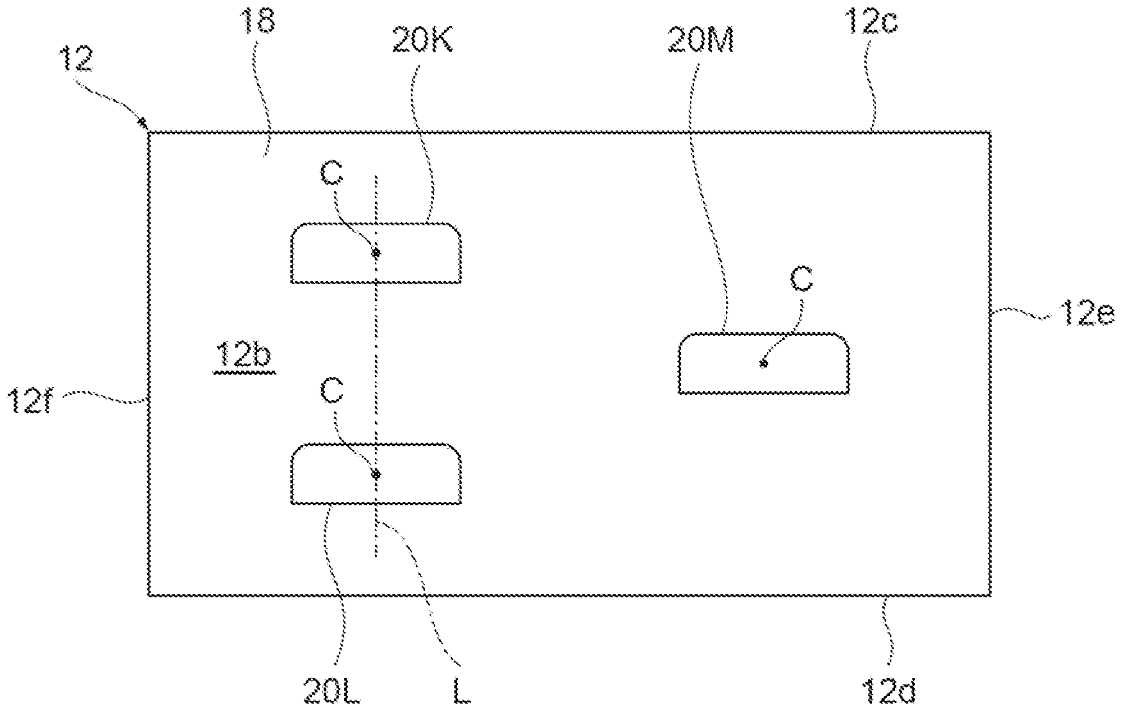
FIG. 15 is a view showing the arrangement of the through conductors shown in FIG. 14 on the element-body end face.

The internal electrode 20 shown in FIGS. 14 and 15 includes three through conductors 20K to 20M located between different layers of the plurality of magnetic material layers 19. The shapes of the through conductors 20K to 20M are the same as the shapes of the through conductors 20A to 20D described above. Only the through conductor 20K and the through conductor 20L are arranged along the stacking direction of the element body 12. The through conductor 20M is located between layers intermediate between the through conductors 20K and 20L. Therefore, as shown in FIG. 15, the centers C of the through conductors 20K and 20L are equidistant from the center C of the through conductor 20M.

Also in the configurations shown in FIGS. 14 and 15, the center C of the through conductor 20M (third through conductor) is apart from the virtual line L connecting the center C of the through conductor 20K (first through conductor) and the center C of the through conductor 20L (second through conductor). Therefore, as in the above-described embodiment, heat of the through conductors 20K to 20M is efficiently radiated to the outside of the element body 12.

What is claimed is:

1. A multi-layer inductor comprising:

an element body including a plurality of layers stacked, the element body having a mounting surface orthogonal to stacking direction of the plurality of layers and a pair of end surfaces facing each other in a direction orthogonal to the stacking direction of the plurality of layers;

a plurality of through conductors provided in the element body, extending between the end surfaces along a facing direction of the pair of end surfaces, and having end portions exposed at the end surfaces; and a pair of external electrodes respectively provided on the end surfaces of the element body and integrally covering the plurality of through conductors exposed at the end surfaces, wherein each of the through conductors has a cross-sectional shape extending parallel to the mounting surface in a cross section orthogonal to the facing direction of the pair of end surfaces, and wherein the plurality of through conductors include a first through conductor, a second through conductor, and a third through conductor, and wherein a center of the first through conductor is displaced from a virtual line connecting a center of the second through conductor and a center of the third through conductor in the cross section orthogonal to the facing direction of the pair of end surfaces.

2. The multi-layer inductor according to claim 1, wherein the center of the first through conductor and the center of the second through conductor are equidistant from the center of the third through conductor in the cross section orthogonal to the facing direction of the pair of end surfaces.

3. The multi-layer inductor according to claim 1, wherein each of the through conductors has a rectangular cross-sectional shape extending parallel to the mounting surface and two corners of the rectangular cross-sectional shape on a side farther from the mounting surface are rounded in the cross section orthogonal to the facing direction of the pair of end surfaces.

4. The multi-layer inductor according to claim 1, wherein a length of the through conductor in a first direction orthogonal to the stacking direction of the element body and the facing direction of the pair of end surfaces are 10 to 30% of a length of the element body in the first direction.

* * * * *